United States Patent [19]
Scott

[11] 3,983,379
[45] Sept. 28, 1976

[54] RANDOM SAMPLE STATISTICAL FUNCTION ANALYZER

[75] Inventor: Paul F. Scott, Schenectady, N.Y.

[73] Assignee: General Electric Company, Schenectady, N.Y.

[22] Filed: Feb. 18, 1975

[21] Appl. No.: 550,452

[52] U.S. Cl. ................................. 235/152; 235/181
[51] Int. Cl.² ......................................... G06F 15/34
[58] Field of Search .................... 235/152, 156, 181; 324/77 G

[56] References Cited
UNITED STATES PATENTS

| | | | |
|---|---|---|---|
| 3,646,333 | 2/1972 | Pryor, Jr. ............................ | 235/181 |
| 3,748,451 | 7/1973 | Ingwersen ........................... | 235/156 |
| 3,876,946 | 4/1975 | La Clair et al. ................... | 235/152 X |
| 3,881,097 | 4/1975 | Lehmann et al. .................... | 235/156 |

Primary Examiner—David H. Malzahn
Attorney, Agent, or Firm—Donald R. Campbell; Joseph T. Cohen; Jerome C. Squillaro

[57] ABSTRACT

High bandwidth stationary ergodic signals are randomly sampled upon command of a computer by a pair of high speed sample-and-hold circuits with a variable digital delay as determined by the computer. Between successively sampled data, processing of the samples and correlation function and/or power spectra computations proceed at slow processing speeds preferably using a slow multiplexer, A/D converter, and digital mini-computer.

10 Claims, 8 Drawing Figures

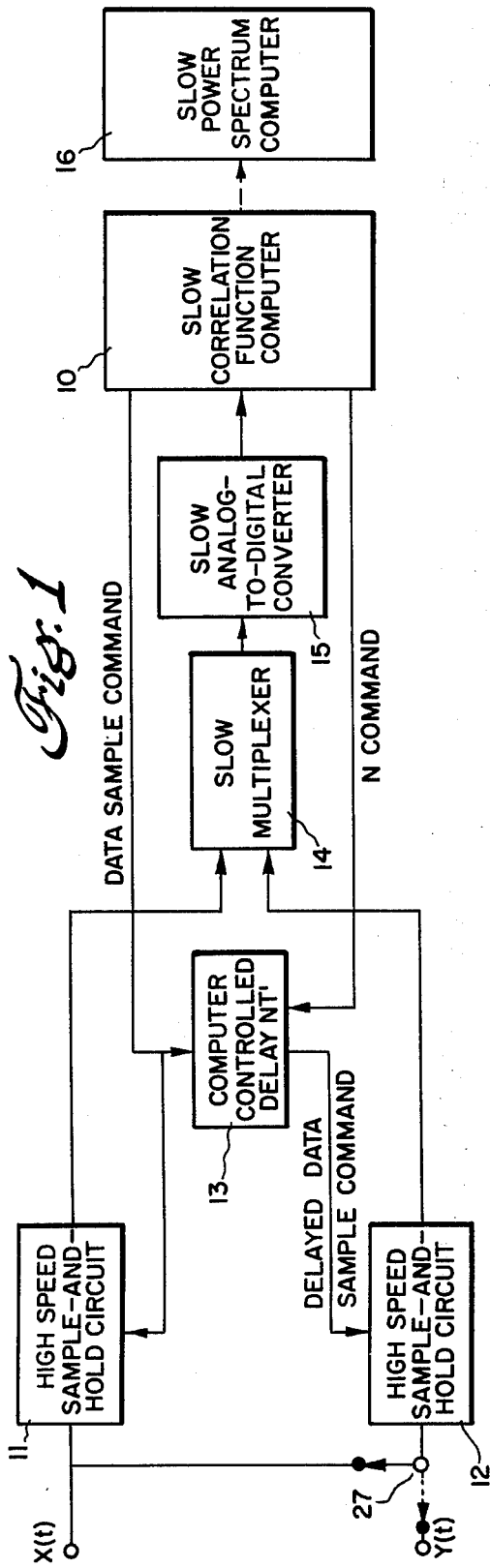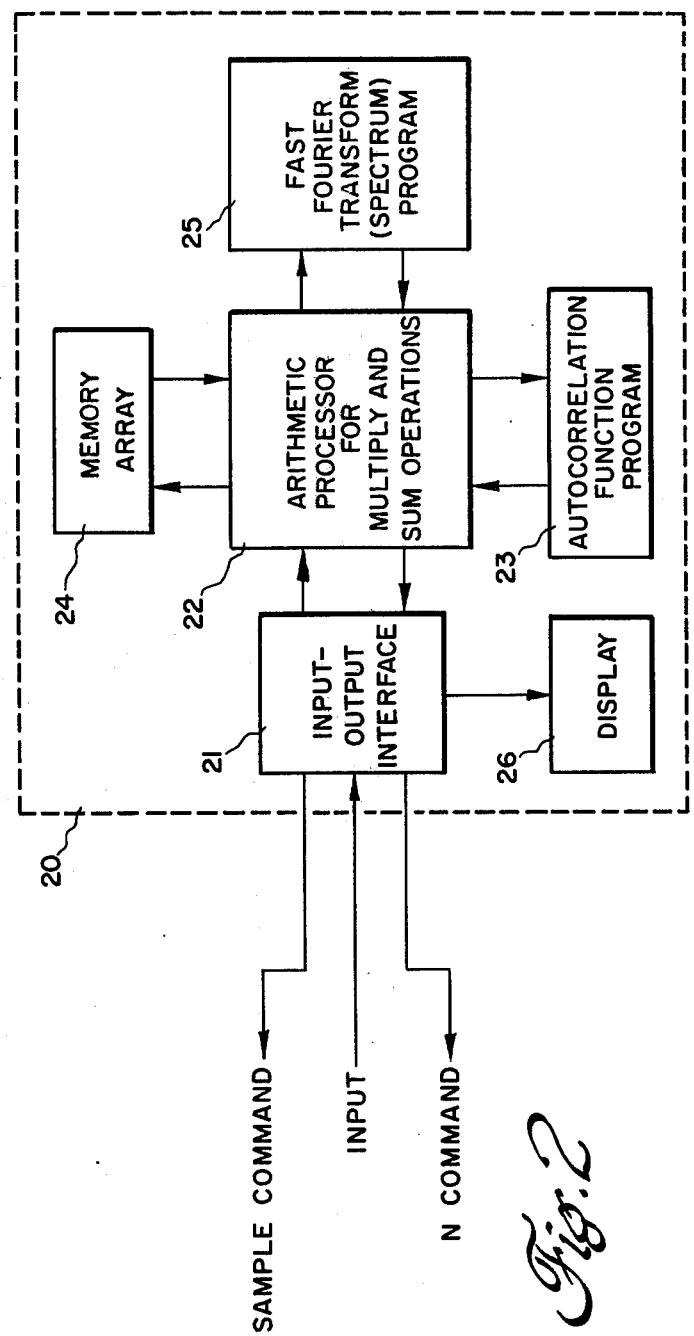

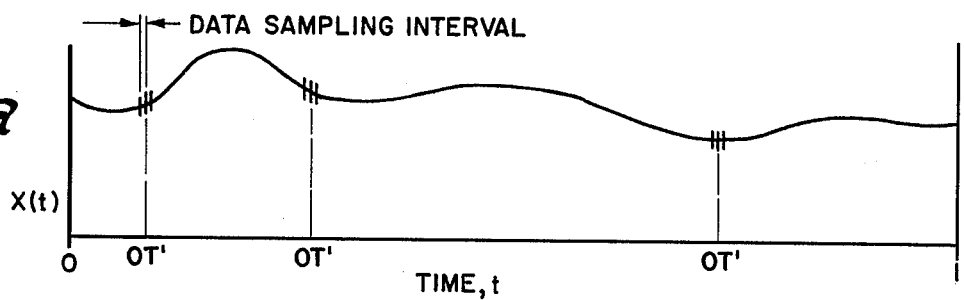
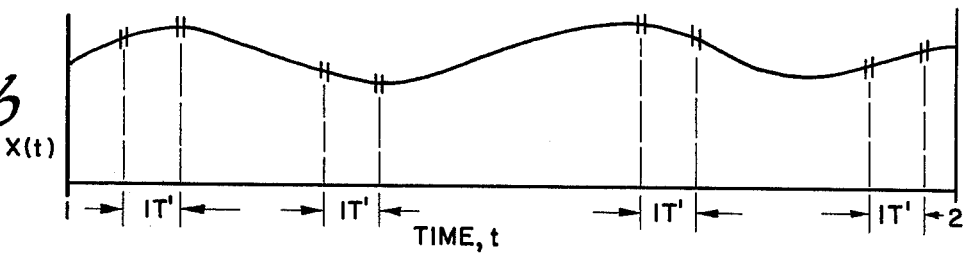
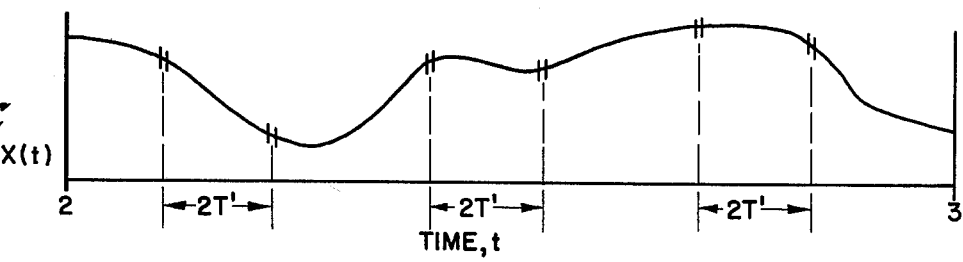
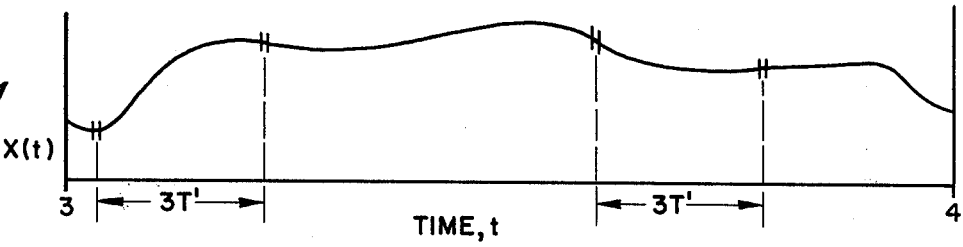
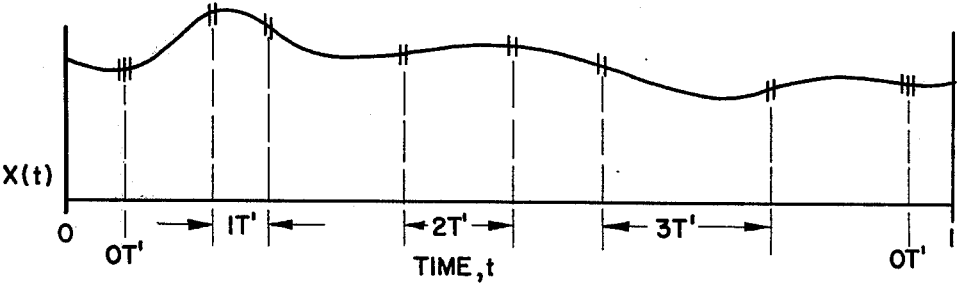
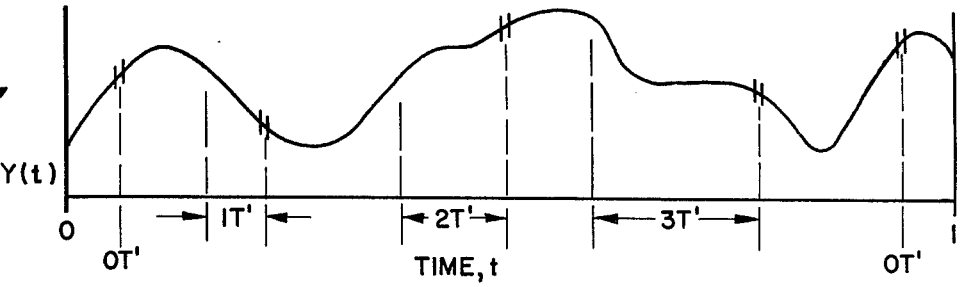

RANDOM SAMPLE STATISTICAL FUNCTION ANALYZER

BACKGROUND OF THE INVENTION

The invention herein described was made in the course of or under a contract, or a subcontract thereunder, with the U.S. Department of the Air Force.

This invention relates to an apparatus and method for estimating the power spectra and correlation functions of stationary ergodic random processes. More particularly, the invention relates to an apparatus and method for high bandwidth signals representative of such processes which utilizes a random sampling technique and high speed sampling while requiring only slow processing and computing components.

The power spectra, autocorrelation function, and cross correlation function of a random process, either singly or in combination, often yield valuable information about the process. The spectra and correlation functions are sometimes required as prerequisites to deriving additional information, as for instance using the spectra of acoustic signals to identify their source and propagation paths for purposes of noise reduction or diagnosis, and similarly using mechanical signals for vibration reduction or diagnosis. Applications of spectra and correlation function analysis, especially for high bandwidths signals exceeding 100 kHz, have traditionally been limited by the expense of the equipment that was needed. Typical prior art techniques required the use of expensive narrow band filter banks or high speed sampled data recovery of the signal for mini-computer/Fast Fourier Transform (FFT) processing. For high bandwidth signals the mini-computer/FFt approach is economically advantageous as compared to the narrow band filter approach but has necessitated a high speed analog-to-digital converter and a fast storage cycle memory, both of which are very expensive.

The present invention is directed to a spectrum and correlation function apparatus and method for high bandwidth signals that is less demanding as to the speed of processing of the sampled analog data and therefore can use lower cost components. The technique to be described is usable only for the characterization of stationary ergodic processes, examples of which are the analysis of jet engine exhaust velocity turbulence for quiet engine development and theoretical noise studies, and the analysis of acoustic and vibration signals as previously mentioned.

SUMMARY OF THE INVENTION

In accordance with the invention, an apparatus and method for analyzing signals representative of a stationary ergodic process utilizes a random sampling technique so that high bandwidth signals are sampled by a pair of high speed sample-and-hold circuits while the processing of the samples and statistical function estimate computations are performed by an asynchronously operated computer at slow processing speeds. The high speed sampling is initiated upon command from the computer to successively obtain a pair of analog data samples with a predetermined, variable digital delay between each sample pair as determined by command from the computer. The computations performed at slow processing speeds by the computer include either autocorrelation or cross correlation function computations and optionally includes power spectra computations when the power spectrum is desired. The high speed sampling and slow processing and computation steps are repeated successively until a large number of sample pairs at each digital delay value are obtained from which to compute the desired correlation function estimate and/or power spectra estimate.

The random function statistical function analyzer in addition to the two high speed sample-and-hold circuits also includes a computer controlled digital delay circuit connected to the input of the second sample-and-hold circuit. In the preferred embodiment, the pairs of analog data samples are fed directly to a slow multiplexer and a slow analog-to-digital converter for producing digital representations of the analog data. The digital computer can be a special computer but is desirably a properly programmed general purpose mini-computer to perform the directed correlation function estimate computations as is known in the art and then supply data sample commands and digital delay or N commands to the first sample-and-hold circuit and the digital delay circuit (where the variable delay is NT'), and the power spectra estimate computations are performed as desired. The maximum usable frequency of this analyzer is thus determined by the data sampling interval and the precision of the delay between samples in each pair, both of which pose no technical problem.

BRIEF DESCRIPTION OF THE DRAWINGS

FIG. 1 is a block diagram of the random sample spectrum and correlation function analyzer constructed according to the preferred embodiment of the invention;

FIG. 2 is a schematic block diagram of a minicomputer for use in the system of FIG. 1;

FIGS. 3a–3d are continuous time diagrams of a signal $X(t)$ which is representative of a stationary ergodic process, illustrating respectively randomly sampled pairs of analog data samples of the signal $X(t)$ with delays or lags of 0T'–3T' as are needed for autocorrelation function computations;

FIG. 4 shows the time diagram of FIG. 3a with the randomly sampled pairs of analog data samples taken in a difference sequence than in FIGS. 3a–3d; and FIG. 5 is a time diagram of a second signal $Y(t)$ representative of the stationary ergodic process, illustrating for the sampling sequence of FIG. 4 the delayed analog data samples obtained and used with the first such data sample in each pair in FIG. 4 for cross correlation function computations.

DESCRIPTION OF THE PREFERRED EMBODIMENTS

A stationary ergodic process can be described as a stationary process having the property of ergodicity, where a process $x(t)$ is stationary if each of the probability distributions is unaffected by a change in the time parameter $t$, and ergodicity is a property of dynamic stochastic systems which in general terms may be expressed by saying that a system is ergodic if it tends in probability to a limiting form which is independent of the initial conditions. By another definition used by those skilled in the art, if a process is stationary and ergodic the time averages and ensembles averages are interchangeable, an ensemble being an infinite collection of the sample functions of the random process $x(t)$. In the practice of the invention, a continuous or discontinuous signal representative of the stationary ergodic process can be utilized in view of the fact that only random sampling is required. As will be evident from the discussion, the random sample spectrum and correlation function analyzer and associated method are most useful for high bandwidth signals exceeding 100 kHz up to about 100 MHz, since at these high frequencies it is expensive and technically difficult to sample the signal continuously.

If it can be assumed that a process is stationary and ergodic, then it is known that the autocorrelation function may be found from the equation $$R_{xx}(T) = \lim_{T \to \infty} \frac{1}{2T} \int_{-T}^{T} X(t) X(t+T) dt, \quad (1)$$

where T is the lag, and the integration interval extends from $-T$ to $T$. Equation (1) is referred to as the time average integral. The power spectra is found by taking the Fourier Transform of the autocorrelation function. To estimate this function, a common approach is to digitize the time function, $X(t)$, so that $X(t) \to X(K\Delta T)$, where $K$ is an integer and $\Delta T$ is chosen in accordandce with Shannon's theorem (i.e., $1/\Delta T \geq$ twice the maximum discernable frequency component of the spectra $S_x(\omega)$ of the time function $X(t)$). Thus the autocorrelation function estimate becomes $$R_{xx}(N) = \lim_{M \to \infty} \sum_{K=0}^{M-1} \frac{1}{M} X(K) X(K+N), \quad (2)$$

where $K$ is an integer, $N$ is the lag or delay, $M$ is the total number of samples, and the summation is made from $K = 0$ to $M-1$. Equation (2) is referred to as the summation average. In this estimate $X(K)$ must be sampled and stored in the correlation processor at a rate of $1/\Delta T$ which in the case of high bandwidth signals is prohibitively high.

The theoretical basis of the invention can now be explained. If it is noted that equation (2) is the average of the $X(K) X(K+N)$ products, and realized that the time function $X(t)$ is stationary and ergodic (an assumption required to use equation (2) in the first place), then it follows that this average is independent of the times $K\Delta T$ at which the products are taken. That is, the function $X(t)$ can be randomly sampled, and for each product to be computed, one sample represents $X(t)$ and the other $X(t + N\Delta T)$. Hereafter, the digitized delay $N \Delta T$ is referred to as $NT'$, where $T'$ is the smallest or unit lag and is at least 10 to 20 times greater than the data sampling interval. For high bandwidth signals, the data sampling interval is relatively short in order that the analog value of the sample be relatively constant while the signal is being sampled. Based on the foregoing, the autocorrelation function $R_{xx}(KT')$ can be estimated using the apparatus shown in FIGS. 1 and 2. Referring to FIG. 1, by way of brief description, a slow processing speed correlation function computer 10 with a processing rate less than 5 kHz, for example, commands a pair of high speed sample-and-hold circuits 11 and 12. For each pair of analog data samples to be multiplied together, one sample-and-hold circuit 11 records $X(t)$ while the other circuit 12 records $X(t + NT')$, where $N$ is adjusted by correlation computer 10 and controlled by a precision digital delay circuit 13. These two values are then leisurely read by a slow processing speed multiplexer 14 and fed serially to a slow processing speed analog-to-digital converter 15. In the asynchronously operated correlation function computer 10, the $X(K) X(K+N)$ product is computed and averaged by a slow arithmetic processor and memory. When sufficient products are available for all lags, $NT'$, a usable autocorrelation function estimate is available for evaluation. When a power spectrum estimate is desired, a suitable slow processing speed power spectrum computer 16 is employed to take the Fourier Transform according to the known equation $$S_x(\omega) = 2 \sum_{i=0}^{M-1} R_{xx}(i) \cos(\omega i \Delta T) - R_{xx}(0), \quad (3)$$

assuming that the autocorrelation function estimates $R_{xx}(0)$ through $R_{xx}(M-1)$ are available. Using the random sampling technique herein described, the maximum usable frequency obtainable is limited by the sampling interval accuracy of the sample-and-hold circuits and the precision of the computer controlled delay circuit 13, both of which poses no technical problem as regards state-of-the-art equipment.

To further clarify the concept of random sampling, FIGS. 3a–3d are time diagrams of a continuous signal which varies with the function $X(t)$ and is representative of a stationary ergodic process wherein each time diagram illustrates respectively randomly sampled pairs of analog data samples of the signal $X(t)$ with delays of $0T'$–$3T'$ as are needed for autocorrelation function computations, In practice, N usually has a large number of integer values and a large number of pairs of analog data samples are taken for each digital delay time. The signal $X(t)$, by way of example, is a varying output voltage. The numbers 0-1, . . . 3-4 indicate elapsed time in arbitrary units from a starting time. In FIG. 3a for the case of 0 delay between each pair of analog data samples, the data sampling interval of each sample-and-hold circuit is indicated and is sufficiently short that the signal can be considered constant during the sampling interval. The two samples in each pair are taken simultaneously or closely following one another as illustrated since in practice there is some delay in feeding through the digital delay circuit 13. In accordance with the invention, the successive pairs of analog data samples are completely randomly spaced along the time axis as here shown, or are spaced randomly to allow sufficient time between consecutive sample pairs to complete the statistical function computer computations before taking the next pair. In FIG. 3b the two samples in each pair are separated by the delay time $1T'$, where the unit lag $T'$ is at least 10 to 20 times longer than the data sampling interval. FIG. 3c shows randomly sampled pairs of analog data samples with the delay $3T'$, and so on for increasingly larger values of N not here illustrated. For each value of delay $NT'$, the sampling can be performed completely at random provided there are sufficient computed product pairs at each value of delay time to obtain a statistical mean. FIG. 4 illustrates a different sequence for the random sampling of the signal $X(t)$ in which the successively taken pairs of analog data samples have the delay times $0T'$, $1T'$, $2T'$, $3T'$, up to the largest value of $NT'$, and then repeating the series of digitally increasing delays until a sufficiently large number of samples is obtained. These pairs of analog data samples in the same manner can be completely randomly spaced, or can be spaced randomly with sufficient time between pairs to at least perform the desired computations.

The operation of the random sample analyzer of FIGS. 1 and 2 for the analysis of high bandwidth signals will now be reviewed in greater detail. A data sample command to initiate a cycle of operation is derived from the slow correlation function computer 10 and supplied in parallel or simultaneously to the first high speed sample-and-hold circuit 11 and to the computer controlled delay circuit 13. The first analog data sample of the signal $X(t)$ taken during the data sampling interval is held in storage momentarily and then fed to one input channel of the slow processing speed multiplexer 14. The computer controlled digital delay generator 13 is typically a one-shot multivibrator or a programmable counter, with the amount of delay $NT'$ being determined by an $N$ command signal also derived from the computer 10 or optionally the computer 16. A delayed data sample command is generated and supplied to the second high speed sample-and-hold circuit 12, which in corresponding fashion takes from the signal $X(t)$ the delayed analog data sample and momentarily stores the second sample before feeding it to another input channel of the slow multiplexer 14. As is evident from the previous discussion, the processing of the two signal samples and the computation of the correlation function and power spectrum, if desired, is performed at a leisurely pace. Multiplexer circuit 14 is of conventional design, as are the other components of the random sample statistical function analyzer, and feeds the sampled analog information serially to the slow processing speed analog-to-digital converter 15. The digital representations of the pair of analog data samples are then supplied serially to the slow digital correlation function computer 10 where the two samples in digital form are multiplied together to obtain a product, summed with the other products for that particular delay value, and divided by the number of the samples to obtain the summation average. The equation for $R_{xx}(N)$ has been given previously. The various values of the autocorrelation function at different lags are optionally supplied to the slow processing speed digital power spectrum computer 16 for generation of the power spectra $S_x(\omega)$ in accordance with the equation previously given. The $N$ command signal which controls the digital delay circuit 13 and the value of the delay $NT'$ between each pair of samples is progressively increased only after all the sample pairs at a particular delay are obtained and processed, or is repetively successively indexed as by means of a counter after each sample pair is obtained and processed as described with regard to FIG. 4.

Correlation function computer 10 and power spectrum computer 16 can be a properly programmed digital minicomputer, a special purpose correlation function generator or correlator, or a properly programmed general digital computer. The preferred embodiment of the invention illustrated in FIG. 2 utilizes a general purpose mini-computer such as the presently well-known PDP-8/E, manufactured by the Digital Equipment Corp. of Maynard, Mass., which is programmed to first compute the autocorrelation function at each value of the lag and then the power spectrum for selected frequency domains. To compute the power spectrum, the well-known mini-computer/Fast Fourier Transform approach is preferably used. The main functional components of the mini-computer 20 are illustrated in schematic block diagram form in FIG. 2 to facilitate the explanation. Input data in the form of digital representations of the pairs of samples analog data are fed serially through the input-output interface 21 to the slow processing speed arithmetic processor 22. The arithmetic processor performs the desired multiply and summing operations under the control of a suitable autocorrelation function program 23, transferring data to and from a slow memory array 24 as is required. When a value of $R_{xx}(N)$ for each particular delay is obtained, the power spectrum is computed in similar fashion under the control of Fast Fourier Transform program 25. Under the control of the program instructions, as is evident to those skilled in the art, a sample command is generated, preferably when the autocorrelation function estimate computations are completed, but can be generated if desired after making the power spectra estimate computations, and fed through the input-output interface 21 to the first high speed sample and hold circuit 11 and the computer controlled delay circuit 13 as previously described. After appropriate intervals, a $N$ command signal is generated in response to the program instructions and supplied to the computer controlled delay circuit 13, as previously described. It is believed that the foregoing description of the mini-computer 20 to calculate autocorrelation functions and power spectra is adequate to those of ordinary skill in the art. The display device 26 for the computed information can take various forms.

Instead of calculating the autocorrelation function, the cross correlation function $R_{xy}(N)$ can also be calculated and optionally used to derive the cross power spectra. Referring now to FIGS. 4 and 5, the first analog data sample in each pair is taken from the signal $X(t)$ as shown in FIG. 4, while the delayed analog data sample is now obtained from the second signal $Y(t)$ as shown in FIG. 5. The signal $Y(t)$ is also representative of the stationary ergodic process and is sampled by the second high speed sample-and-hold circuit 12 by moving the input switch 27 to the proper position as illustrated in dashed lines in FIG. 1. The processing of the analog data samples and computation of the cross correlation function is as previously described for the autocorrelation function except that the sampled value of $Y(t)$ is substituted for the second sampled value of $X(t)$. The cross power spectra computed using the cross correlation function represents the power common to both signals.

Within the broader scope of the invention, in addition to the computer controlled high speed sample-and-hold circuits and precision digital delay circuit, a low bandwidth analog multiplier and associated equipment can be used for making the slow processing speed statistical function computations. For example, the analog data samples taken at a high sampling speed are fed to an analog multiplier, and the product is then fed to a summing amplifier and an associated delay line storage. The delay line is for instance a bucket brigade delay line having its output fed into another input of the summer such that the correlation function is stored in the delay line. Also a hybrid computer approach can be utilized. Accordingly, the broadly stated method of analyzing high bandwidth signals representative of a stationary ergodic process includes the steps of providing a slow processing speed computer for performing desired statistical function estimate computations including at least correlation function estimate computations; repeatedly randomly sampling at least one such signal at a high sampling speed upon command from the computer to obtain a pair of analog data samples with a predetermined digital delay between the sample pair; processing the sample pair and performing statistical function estimate computations at slow processing speeds; successively repeating the random high speed samplings while selectively varying the digital delay of each sample pair upon command from the computer to obtain a large number of sample pairs at each digital delay value; and successively processing and performing computations for each sample pair at the slow processing speeds, to thereby generate the desired statistical function estimates. Using the random sample analyzer and method, the maximum usable frequency obtainable by this technique is limited by the accuracy of the data sampling intervals of the high speed sample-and-hold circuits and the precision of the computer controlled digital delay circuit, both of which pose no technical problem using available state-of-the art equipment. This processing technique enables the production of usable correlation function and power spectrum estimates at arbitrary mean sampling rates. It eliminates the need for the mean sampling rate to be several times the Nyquist frequency of the original data, which is required for conventional analysis techniques to produce usable estimates in a random sampling situation.

One application of the random sample statistical function analyzer is in the analysis of jet engine exhaust velocity turbulence for quiet engine development and theoretical noise studies.

Another application is to add spectral analysis capability to computers used for process control. The spectral analysis can be accomplished during stand-by periods and used to provide diagnostic information. Other applications for the analysis of mechanical vibrations and acoustic signals have been mentioned.

While the invention has been particularly shown and described with reference to preferred embodiments thereof, it will be understood by those skilled in the art that the foregoing and other changes in form and details may be made therein without departing from the spirit and scope of the invention.

What is claimed is:
1. A random sample statistical function analyzer comprising
   first and second high sampling speed sample-and-hold circuits for sampling a high bandwidth signal having a frequency exceeding 100 kilohertz which is representative of a stationary ergodic process, and a digital delay circuit connected to an input of said second sample-and-hold circuit for generating variable delay intervals,
   said first and second sample-and-hold circuits being repetitively operative in response to first commands each applied to said first sample-and-hold circuit and digital delay circuit to obtain a large number of randomly sampled pairs of analog data samples with a predetermined digital delay between each sample pair as determined by second commands each selectively applied to said digital delay circuit,
   slow processing speed multiplexer and analog-to-digital converter means connected to the outputs of said sample-and-hold circuits for processing each pair of analog data samples and producing a pair of digital representations thereof, and
   slow processing speed digital computer means to which each pair of digital representations is supplied for performing desired statistical function estimate computations including at least autocorrection function estimate computations, said digital computer means further generating each first command and selectively generating each second command following completion of the desired statistical function computations.

2. A random sample analyzer according to claim 1 wherein said digital computer means performs the autocorrelation function estimate computations and also power spectra estimate computations, said digital computer means generating said first command and selectively generating said second command following completion of the autocorrelation function estimate computations to thereby obtain the sequentially next pair of analog data samples.

3. A random sample analyzer according to claim 2 wherein said digital computer means is an asynchronously operated slow processing speed mini-computer.

4. A random sample statistical function analyzer comprising
   first and second high sampling speed sample-and-hold circuits for respectively sampling two high bandwidth signals each having a frequency exceeding 100 kilohertz which are representative of a stationary ergodic process, and a digital delay circuit connected to an input of said second sample-and-hold circuit for generating variable delay intervals,
   said first and second sample-and-hold circuits being repetitively operative in response to first commands each applied to said first sample-and-hold circuit and digital delay circuit to obtain a large number of randomly sampled pairs of analog data samples with a predetermined digital delay between each sample pair as determined by second commands each selectively applied to said digital delay circuit,
   slow processing speed multiplexer and analog-to-digital converter means connected to the outputs of said sample-and-hold circuits for processing each pair of analog data samples and producing a pair of digital representations thereof, and
   slow processing speed digital computer means to which each pair of digital representations is supplied for performing desired statistical function estimate computations including at least cross correlation function estimate computations, said digital computer means further generating each first command and selectively generating each second command following completion of the desired statistical function estimate computations.

5. A random sample analyzer according to claim 4 wherein said digital computer means performs the cross correlation function estimate computations and also cross power spectra estimate computations, said digital computer means generating said first command and selectively generating said second command following completion of the cross correlation function estimate computations to thereby obtain the sequentially next pair of analog data samples.

6. A random sample analyzer according to claim 5 wherein said digital computer means is an asynchronously operated slow processing speed mini-computer.

7. A method of analyzing high bandwidth signals having a frequency exceeding 100 kilohertz which are representative of a stationary ergodic process comprising the steps of
   sampling a high bandwidth signal representative of a stationary ergodic process at a high sampling speed upon command from a computer to obtain a pair of analog data samples with a predetermined digital delay between the sample pair, processing each sample pair and performing computer statistical function estimate computations at slow processing speeds including at least autocorrelation function estimate computions, and thereafter generating commands to obtain the next randomly sampled pair of analog data samples with a predetermined digital delay therebetween, successively repeating the high speed sampling of said signal upon command from the computer while selectively varying the digital delay of each analog data sample pair to obtain a large number of sample pairs at each digital delay value, and successively processing and performing computer computations for each sample pair at slow processing speeds before initiating commands to sample the signal and obtain the next pair of analog data samples with a predetermined delay therebetween, to thereby generate the desired statistical function estimates.

8. A random sample analyzer according to claim 7 wherein the step of processing each sample pair and performing computations at slow processing speeds comprises multiplexing said pair of analog data samples, converting each analog data sample to a digital representation, and supplying said digital representations to the computer.

9. A method of analyzing high bandwidth signals having a frequency exceeding 100 kilohertz which are representative of a stationary ergodic process comprising the steps of alternately sampling two high bandwidth signals representative of a stationary ergodic process at a high sampling speed upon command from a computer to obtain a pair of analog data samples with a predetermined digital delay between the sample pair, processing said sample pair and performing computer statistical function estimate computations at slow processing speeds including at least cross correlation function estimate computations, and thereafter generating commands to obtain the next randomly sampled pair of analog data samples with a predetermined digital delay therebetween, successively repeating the alternate high speed sampling of said signals upon command from the computer while selectively varying the digital delay of each sample pair to obtain a large number of sample pairs at each digital delay value, and successively processing and performing computer computations for each sample pair at slow processing speeds before initiating commands to sample the signals and obtain the next pair of analog data samples with a predetermined delay therebetween, to thereby generate the desired statistical function estimates.

10. A random sample analyzer according to claim 9 wherein the step of processing each sample pair and performing computations at slow processing speeds comprises multiplexing said pair of analog data samples, converting each analog data sample to a digital representation, and supplying said digital representations to the computer.

* * * * *